United States Patent
Alberth, Jr. et al.

(10) Patent No.: US 8,280,409 B2
(45) Date of Patent: Oct. 2, 2012

(54) SYSTEM, METHOD, AND DEVICE FOR PROVIDING TEMPORARY COMMUNICATION AND CALENDARING APPLICATIONS IN A PRIVATE NETWORK

(75) Inventors: William P. Alberth, Jr., Prairie Grove, IL (US); Kristie King, Oakwood Hills, IL (US); Patti Robb, Prairie Grove, IL (US); Wayne King, Oakwood Hills, IL (US)

(73) Assignee: Motorola Mobility LLC, Libertyville, IL (US)

( * ) Notice: Subject to any disclaimer, the term of this patent is extended or adjusted under 35 U.S.C. 154(b) by 298 days.

(21) Appl. No.: 12/647,467

(22) Filed: Dec. 26, 2009

(65) Prior Publication Data

US 2011/0158207 A1 Jun. 30, 2011

(51) Int. Cl.
*H04M 3/42* (2006.01)
*H04L 29/06* (2006.01)
*H04W 4/00* (2009.01)
*H04W 24/00* (2009.01)

(52) U.S. Cl. ............... 455/456.3; 455/414.1; 455/414.3; 455/435.1; 455/432.3

(58) Field of Classification Search .................. 455/41.2, 455/414.1, 418–420, 461–462, 466, 500, 455/502, 508–509, 512, 517–519, 524–525, 455/550.1, 551, 552.1, 554.1–554.2, 555, 455/560–561, 414.3–414.4, 432.3, 434, 435.1–435.2, 455/456.1–456.3, 456.5–456.6, 556.1–556.2, 455/557–558, 432.1; 370/310, 313, 328–329, 370/338, 341, 348; 711/205–207; 705/5–6, 705/7.12–7.21
See application file for complete search history.

(56) References Cited

U.S. PATENT DOCUMENTS

| | | | |
|---|---|---|---|
| 7,328,011 | B2 | 2/2008 | Fagan et al. |
| 7,437,155 | B2* | 10/2008 | Levitan .......................... 455/433 |
| 7,526,296 | B1* | 4/2009 | Lundy et al. ................... 455/461 |
| 7,937,097 | B2* | 5/2011 | Kelley ........................... 455/466 |
| 2002/0184331 | A1 | 12/2002 | Blight et al. |
| 2004/0116115 | A1 | 6/2004 | Ertel |
| 2008/0070550 | A1* | 3/2008 | Hose .............................. 455/411 |
| 2008/0098436 | A1* | 4/2008 | White .............................. 725/58 |
| 2008/0140434 | A1* | 6/2008 | O'Brien ............................ 705/1 |
| 2009/0110177 | A1* | 4/2009 | Sivakumar ............... 379/218.01 |
| 2009/0222838 | A1 | 9/2009 | Ho |
| 2009/0228492 | A1* | 9/2009 | Valdez et al. .................... 707/10 |
| 2010/0211575 | A1* | 8/2010 | Collins et al. .................. 707/749 |
| 2010/0273509 | A1* | 10/2010 | Sweeney et al. ........... 455/456.3 |

FOREIGN PATENT DOCUMENTS

EP 1956532 A1 8/2008

OTHER PUBLICATIONS

Patent Cooperation Treaty, International Search Report and Written Opinion of the International Searching Authority for International Application No. PCT/US2010/058161, May 9, 2011, 11 pages.

* cited by examiner

*Primary Examiner* — Meless Zewdu (57) ABSTRACT

A communication device (100) and method (700) are disclosed for providing temporary communication features, temporary scheduling features, or combinations thereof associated with temporary membership in a private network (101), such as that associated with a hotel (102), resort (103), or cruise ship (105). An association module (209) can register (701) the communication device (100) with the private network (101) as a temporary member device. A private network information retriever (210) can then retrieve (702) one or both of private network directory information (109) and private network scheduling information (110). An integrator (211) can then integrate this information into an address book application (212) or a calendaring application (215) to provide additional functionality for the communication device (100).

18 Claims, 5 Drawing Sheets

SYSTEM, METHOD, AND DEVICE FOR PROVIDING TEMPORARY COMMUNICATION AND CALENDARING APPLICATIONS IN A PRIVATE NETWORK

BACKGROUND

1. Technical Field

This invention relates generally to portable electronic devices having calendaring and address book applications, and more particularly to methods and systems for integrating private network information into these applications when the portable electronic devices are in temporary use with private networks, such as cruise ships, airplanes, hotels, convention centers, resorts, and the like.

2. Background Art

The use of portable communication devices, such as mobile telephones, "smart" devices, and personal digital assistants, is becoming more prevalent. People today use these devices not only for communication, but also to maintain to-do lists, personal and business calendars, and contact lists of friends, family, and co-workers. It is not uncommon for a person to use a single device to make telephone calls, send SMS text messages, listen to music, take photographs, maintain a calendar, surf the Internet, and maintain an address book.

Not surprisingly, many people carry these communication devices when traveling. A person can store, for example, the name of a hotel, its telephone number, its address, map thereto, and even a reservation confirmation number in a single electronic device. The person can even use the device for telecommunication while staying in the hotel. Both the storage and usage processes can sometimes be less than efficient, however. For instance, a person must generally manually input information such as the name of the hotel, its telephone number, its address, and the reservation information. Regarding communication, if a person desires to call the front desk of the hotel from their room, such as to check out using their mobile telephone, the person will use the mobile telephone to first connect with a cellular service provider's tower, then to another service provider's land based communication network, then to a private exchange of the hotel, finally to the telephone of the clerk at the front desk.

There is thus a need for a communication device having more efficient communication features or scheduling features configured for use with private networks.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to providing temporary communication features and/or temporary scheduling features in a communication device. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of providing temporary calling features and/or temporary scheduling features in a communication device as described herein. The non-processor circuits may include, but are not limited to, a radio receiver, a radio transmitter, signal drivers, clock circuits, power source circuits, and user input devices. As such, these functions may be interpreted as steps of a method to perform the provisioning of temporary communication features or temporary scheduling features. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention provide methods, systems, and devices for providing temporary communication capabilities and temporary scheduling capabilities in a communication device, such as a mobile telephone, personal digital assistant, or other smart device. Embodiments of the present invention offer advantages over prior art solutions in that the temporary communication features and scheduling features are performed locally, in the wireless communication device, upon receiving the private network directory information or the private directory scheduling information. Prior art attempts to provide certain private network calling features have required these services be affirmatively performed by a network, rather than by a wireless communication device itself. Embodiments of the present invention provide a solution that is operable both when a communication device is within a private network and without.

Methods and devices described herein can be used in conjunction with a user's temporary membership in a private network. Examples of private networks include communication systems associated with cruise ships, airplanes, hotels, resort properties, company campuses, and so forth. Using a cruise ship as an example, in one embodiment a user registers a wireless communication device, such as a smart phone, with the private network of the cruise ship when initially boarding or checking in. In one embodiment, registration can include the downloading of an application on the smart phone that provides the temporary communication features or temporary scheduling features. In addition to the application, a soft Subscriber Interface Module (soft-SIM) may be used as well.

Once the user has registered the communication device as a temporary member device with the private network of the cruise ship, the communication device can then download private network directory information, private network scheduling information, or both. This information can be updated throughout the user's stay in the private network as needed. Private network directory information can include lists of passengers on the cruise ship along with their staterooms. The private network directory information may also include listings of ship services, such as the concierge, captain's deck, restaurants, shops, and so forth. Private network scheduling information can include a ship itinerary, departure and arrival times, excursion opportunities, special activities, meal times, and so forth.

Once downloaded, the private network directory information and/or private network scheduling information can be stored locally in a memory of the communication device. An integrator can then integrate the private network directory information with a locally stored address book application or other similar contact management application. Similarly, the integrator can integrate the private network scheduling information into a calendaring application or other similar event management application. Thus, while associated with the temporary network, e.g., while on the cruise, the communication device can present the ship's scheduling information with the user's own calendar information in a seamless application. Similarly, the communication device can present the ship's directory information in the address book application of the device.

Other features can be included as well. For example, where a person in the user's address book is on the cruise, while on the cruise ship the address book application may present the "number" as the stateroom in which the person is staying, thereby allowing direct communication capability to the person's state room through the private network. While off the ship, the communication device may instead present the person's actual telephone number, thereby allowing direct communication capability with the person's own communication device through a land-based network.

The communication device may further include a Global Positioning System (GPS) or other means of determining location. Where included, the location determination device would provide a user the feature of being able to request a service, e.g., ordering a drink, while traversing through the private network. Accordingly, the communication device could transmit the location of the user to the purveyor of the private network. As the purveyor would have knowledge of the user's location due to the location determination circuit, the service could be efficiently delivered to the user even if the user moves from the location were the service was ordered.

Additional features associated with embodiments of the invention include the following: In one embodiment, the communication device can use the private network scheduling information to search among preferred data or voice communication network service providers. For example, by querying the ship's itinerary in the device's calendaring application, a communication circuit can be configured to change its settings to preferential systems or dialing prefixes. When the itinerary indicates that the ship is at sea, the device can search for the ship's on-board communication system. Conversely, when the itinerary indicates that the ship is in a particular port, the device can search for a preferred communication services provider for that port as indicated in the private network scheduling information.

Next, using the private network directory information, a user may be presented with room assignments of other passengers. Thus, two related parties would be able to easily find out how far each other's staterooms were apart. In one embodiment, such a presentation of room assignment or passenger lists may be only with passenger permission, such as when a person affirmatively "opts in" to being included in this list. Certain passengers could be listed in preferred groups as well.

Next, using the private network scheduling information, a user may be presented with various forms of calendar events associated with the cruise. One example is that if someone makes a dinner reservation that includes a particular user, that reservation may show up in the user's calendar by way of an update in the private network scheduling information. Similarly, the private network scheduling information can include alerts and other times of interest, including reminder alerts to re-board the ship, reminder alerts on location, traffic, or weather, and so forth. Updated private network scheduling information can include push events such as debarkation times.

In another embodiment, users may "tag" events that are communicated to other users in a group. For example, users in a group, e.g., a family, may be able to tag areas of interest such as a wine tasting, a bingo game, or a ballroom dancing lesson. Once such an event has been tagged, it can then be communicated to the other members of the group through an updated download of the private network scheduling information.

Once a user's temporary membership with a private network ends, in one embodiment the communication device is configured to redact, erase, or remove the private network communication information and/or private network scheduling information from local storage. This is because the information is generally no longer needed once the guest leaves, for example, the cruise ship.

Figure 1:
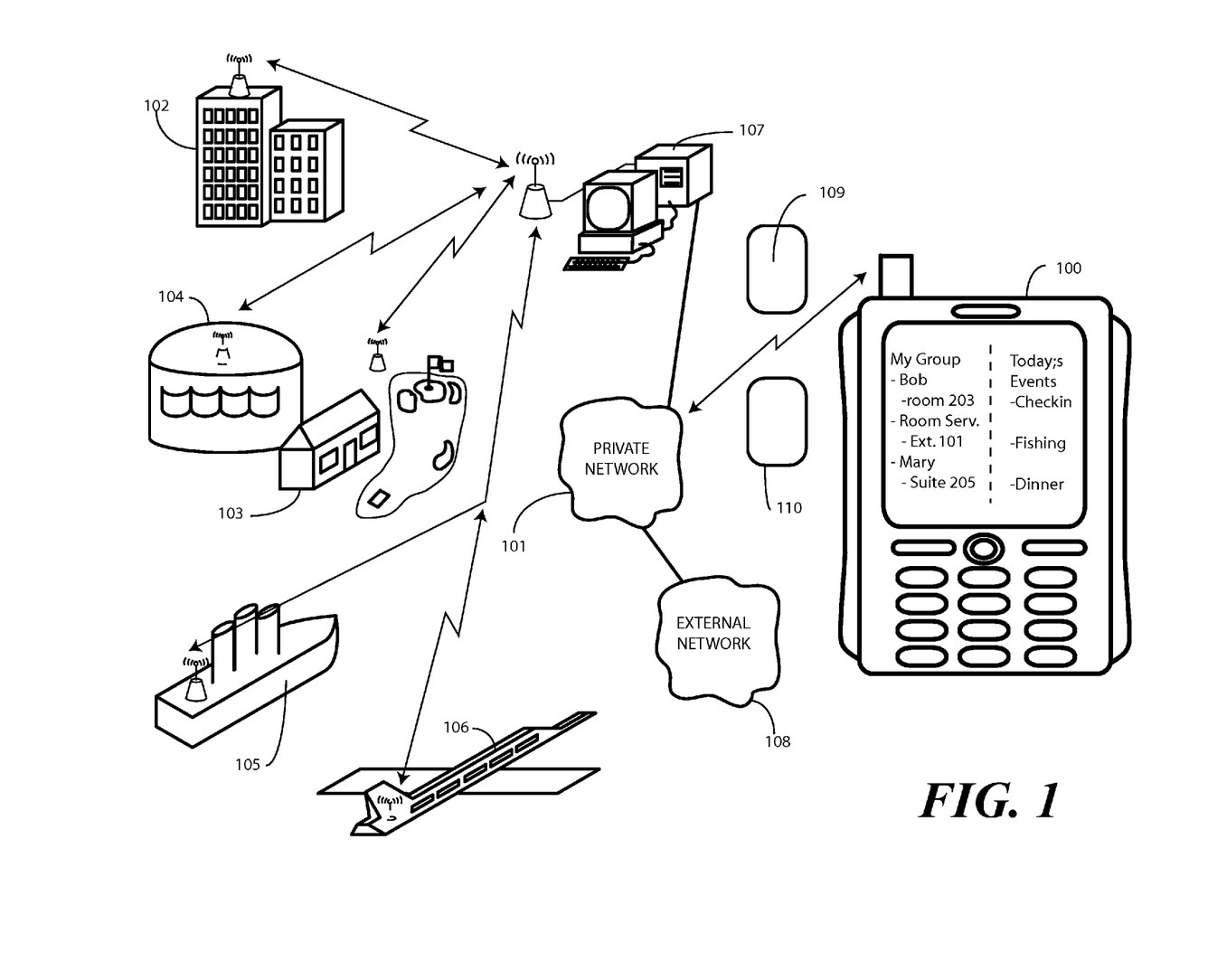
FIG. 1 illustrates a system-level diagram of a communication device having temporary communication features, temporary scheduling features, or combinations thereof, in accordance with embodiments of the invention.

Turning now to FIG. 1, illustrated therein is one embodiment of a communication device 100 configured for temporary communication with a private network 101 in accordance with embodiments of the invention. While a mobile telephone will be used herein for discussion purposes as the communication device 100, it will be clear to those of ordinary skill in the art having the benefit of this disclosure that the invention is not so limited. The temporary communication features and temporary scheduling features described herein could equally be used in other communication devices, such as a personal digital assistant, a laptop computer, or other portable electronic device having communication capabilities.

The private network 101 is one that is associated with a particular location, transport vessel, or vehicle, and may take many different forms. The private network 101, in one embodiment, is a network capable of sending and receiving signals, such as wireless signals. In the illustrative embodiment of FIG. 1, the private network 101 is shown as being a local or enterprise communication network for use with, in, or on, for example, a hotel 102, a resort 103, a convention center 104, a cruise ship 105, or an airplane. The private network 101 can be configured as a private wired and/or wireless network for use within such an enterprise, and may include a server 107, such as an application or data server, coupled thereto for communicating data through the private network 101.

In one embodiment, the private network 101 can be used for members of the private enterprise to communicate with other members of the private enterprise. For example, a person staying in a first room of a hotel 102 can use a corresponding private network 101 to call other rooms therein, without the need of interfacing with an external network 108. Members of the private enterprise can use the private network to communicate with other networks as well. For example, in one embodiment the private network 101 can also be coupled to an external communication network 108, such as a cellular network, a landline network, the Internet, or combinations thereof.

In one embodiment, the private network 101 includes equipment commonly found in a wired or wireless network, such as switches, femtocells, antennas, transponders, and the like. The private network 101 can be a local area network, such as a Wireless Local Area Network (WLAN). Alternatively, the private network 101 can include wired devices, such as a Private Branch Exchange (PBX). The latter may be the case, for example, where the private network 101 services fixed locations such as rooms in a convention center 104 or staterooms on a cruise ship 105. In one embodiment, the private network 101 is configured to provide communication capability across its enterprise, e.g., across the hotel 102 or throughout the convention center 104. The private network 101 is configured to provide communication capability by communicating with wired and/or wireless devices, such as communication device 100.

When a user is a temporary member of the private enterprise, the user may register the communication device 100 with the private network 101 as a temporary member device. In one embodiment, where a mobile telephone is used as the communication device, this can be accomplished by delivering device credentials, such as a telephone number, serial number, International Mobile Subscriber Identification (IMSI), Home Public Land Mobile Network (HPLMN) identifier, identification keys, or other suitable identifier to the private network. The purveyor of the private network 101 can then verify that the communication device 100 is entitled to temporary membership with the server 107. Upon determining this, the registration process between the private network 101 and communication device 100 can be completed. The communication device 100 can then retrieve private network communication information 109, private network scheduling information 110, or combinations thereof from the private network 101. Such information may be stored in a server 107 coupled to the private network 101.

Figure 2:
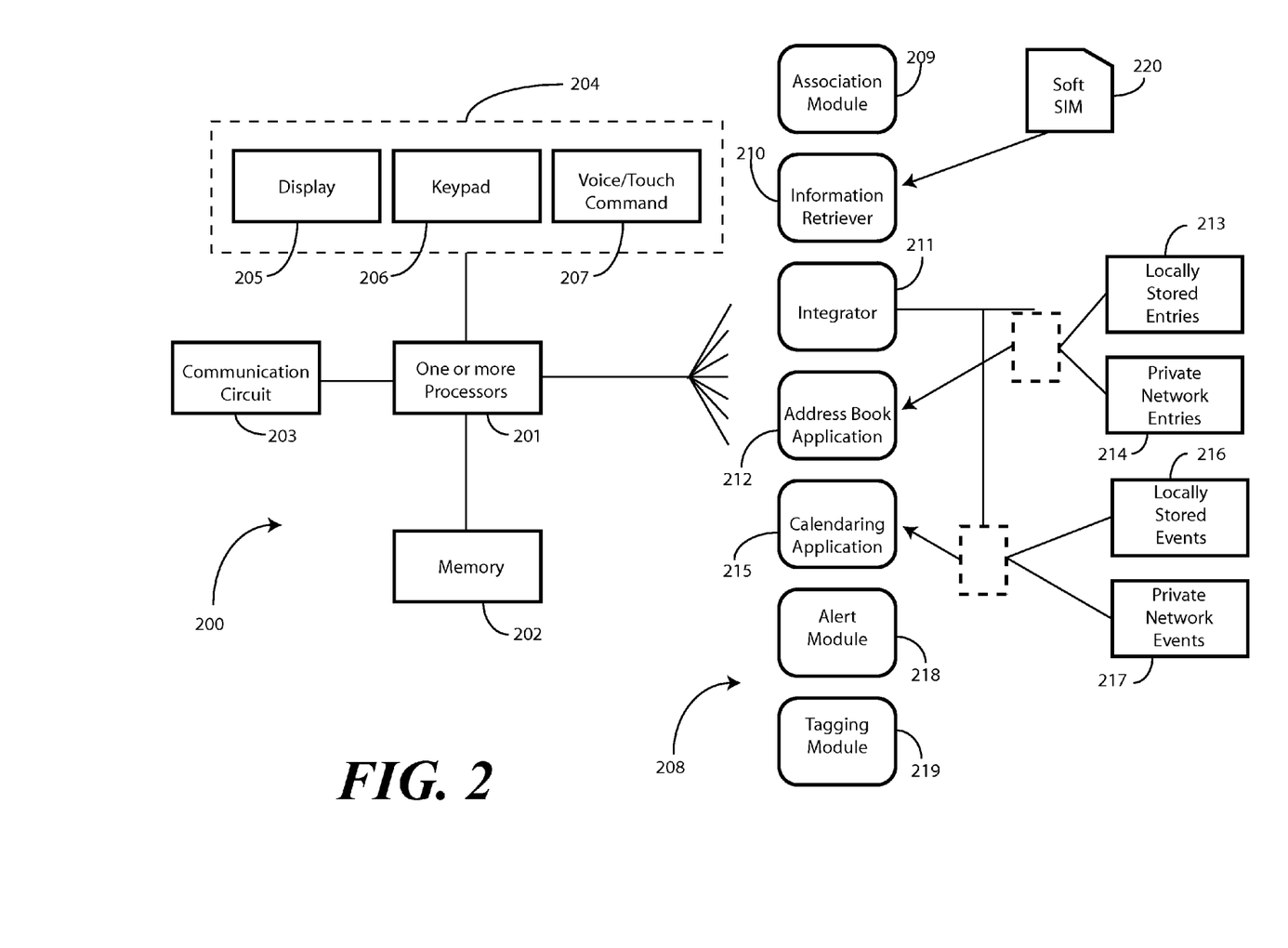
FIG. 2 illustrates a block diagram schematic of a communication device in accordance with embodiments of the invention.

Turning now to FIG. 2, illustrated therein is a schematic block diagram 200 of one communication device (100) in accordance with embodiments of the invention. The schematic block diagram 200 illustrates the internal circuitry and software or firmware modules of the communication device (100).

One or more processors 201 are operable within the communication device (100). The one or more processors 201 are operable with various components of the device, including a memory 202 and a communication circuit 203. The one or more processors 201, which may be any of one or more microprocessors, programmable logic, application specific integrated circuit device, or other similar device, are capable of executing program instructions and methods—such as those shown in FIG. 7—which may be stored either in the one or more processors 201, or in the memory 202, or other computer readable media coupled to the one or more processors 201.

The one or more processors 201 are configured to operate the various functions of the communication device (100), and also to execute software or firmware applications and modules that can be stored in a computer readable medium, such as memory 202. The one or more processors 201 execute this software or firmware, in part, to provide device functionality. The memory 202 may include either or both static and dynamic memory components, may be used for storing both embedded code and user data.

The communication circuit 203 is operable with the one or more processors 201, and is used to facilitate electronic communication with various networks, including the private network (101). Note that it is possible to combine the one or more processors 201, the memory 202, and the communication circuit 203 into a single device or into devices having fewer parts while retaining the functionality of the constituent parts.

The communication circuit 203, which may be one of a receiver or transmitter, and may alternatively be a transceiver, operates in conjunction with the one or more processors 201 to electronically communicate through a communication network. In one embodiment, the communication circuit 203 is configured to communicate both through the private network (101) and other external networks. For example, where the private network comprises a Wi-Fi network, and the communication device (100) is a mobile telephone, the communication circuit 203 may be configured to both communicate through the Wi-Fi network and a traditional cellular network, such as a Code Division Multiple Access (CDMA) network or Global System for Mobile communication (GSM) network. Other examples of networks with which the communication circuit may communicate include Push-to-Talk (PTT) networks, proprietary networks, direct communication networks, and IEEE 802.11 networks.

A user interface 204 is operable with the one or more processors 201 to deliver information to, and receive information from, a user. The user interface can include a display 205, a keypad 206, and optionally a voice or touch command interface 207. These various components can be integrated together. For example, the display 205 can be configured as a touch-sensitive display, thereby combining the touch command interface 207 and display 205 together. Additionally, other components such as a microphone and speaker may be included with the user interface 204.

The one or more processors 201 are, in one embodiment, configured to be operable with one or more modules 208. These modules 208 can be configured as sets of instructions stored in the memory 202 that are usable by the one or more processors 201 to execute a method to provide temporary communication features or temporary scheduling features for a private network (101) as described herein. Alternatively, the modules 208 could be configured in hardware, such as through programmable logic. The modules 208 shown in FIG. 2 are illustrative only. Embodiments of the present invention may use various combinations of modules 208, including subsets of the modules 208 shown in FIG. 2. Further, other modules may be added to further increase device functionality.

An associating module 209 is configured to establish a temporary membership with the private network (101). The associating module 209 can register the communication device (100) with the private network (101) in a variety of ways. For instance, as described above, the associating module 209 can register the communication device (100) with the private network (101) by delivering device credentials, such as a telephone number, serial number, IMSI identifier, HPLMN identifier, or other suitable identifier to the private network (101). The membership registered will be "temporary" because a guest in a hotel (102), in a convention center (104), at a resort (103), on a cruise ship (105), or on an airplane (106) will generally only be a member—or within communication proximity—of the private network (101) for a temporary stay.

Upon registration with the private network (101), a private network information retriever 210 is configured to retrieve at least one of the private network directory information (109) or the private network scheduling information (110) from the private network (101). Embodiments of the private network directory information (109) can include telephone directories, email directories, address directories, location directories, and other directories relating to members of the private network, services and personnel associated with the private network, preferred providers associated with the private network, and so forth. Embodiments of the private network scheduling information (110) can include port departure times, events, check-in and check-out times, communication network access priorities, activities for guest participation, directions associated with particular events, access codes and other permissions for use at particular events, and so forth.

In one embodiment, people and entities included in the private network directory information (109) are only included with advance permission. For example, where the private network directory information (109) includes a list of guests on a cruise ship (105), the cruise ship operator may obtain permission for including the guests' names in a distributed list.

In another embodiment, the private network directory information (109) may include, or be limited to, select groups. For example, the members of a family reunion or school outing may be collectively combined in a group. In such an embodiment, the private network directory information (109) may only include the members of that group. Alternatively, the group may be identified among the other guests.

Once the information is retrieved, an integrator 211 is configured to store the information locally in the memory 202 of the communication device (100). In one embodiment, the integrator 211 is configured to integrate the information with user information in native or other applications of the communication device (100). For example, where the communication device (100) includes an address book application 212 or other similar application for organizing locally stored address entries 213, the integrator 211 can be configured to integrate the private network entries 214 of the private network directory information (109) into the address book application 212. Similarly, where the communication device (100) includes a calendaring application 215 or other similar application for organizing locally stored event entries 216, the integrator 211 can be configured to integrate the private network event entries 217 of the private network scheduling information (110) into the calendaring application 215.

By integrating either or both of the private network directory information (109) and the private network scheduling information (110) into the modules 208 of the communication device (100), a seamless presentation of unified data can occur. For example, telephone numbers from the user's address book and from the private network may be displayed simultaneously. A listing for Bob Smith may show Bob's telephone number of 676-555-1234, while a listing for the promenade deck of a cruise ship (105) may simply be listed with its extension within the private network (101), such as "x-10."

The private network directory information (109) can include communication preferences as well. For example, entries associated with the private network directory information (109), such as those with private network extensions, may be routed through the private network's PBX to the proper extension. Entries associated with the locally stored entries 213 may be routed through the private network to an external communication network (108), such as a Public Land Mobile Network (PLMN). Alternatively, entries associated with the locally stored entries 213, where possible, may be routed directly to the external communication network (108).

In one embodiment, as noted above, the private network directory information (109) associated with a hotel (102) or convention center (104) can include a list of guests and room numbers. Private network directory information (109) associated with a cruise ship (105) can include a list of passengers and corresponding stateroom extensions. Where either is the case, embodiments of the present invention can present the integrated directory information in a variety of ways. In one embodiment, for example, all data can be displayed in an address book application 212. The user's locally stored entries 213 and the private network entries 214 can be presented as a single list, perhaps arranged alphabetically or by another criterion.

In another embodiment, the integrator 211 makes filtering possible. For instance, using the example of a cruise ship (105), a particular passenger may not want to see every other passenger on the cruise ship (105) listed in the address book. They may instead wish only to see listings of passengers they know. Therefore, in one embodiment, the integrator 211 can make this possible by listing only entries common to both the private network directory information (109) and the locally stored entries (213).

Further, the integrator 211 may be configured to substitute a number or contact parameter normally associated with a particular entry in the locally stored entries 213 with a private network (101) number or contact parameter when the communication device (100) is within communication proximity of the private network (101). By way of example, where the private network (101) is associated with a cruise ship (105), the integrator 211 can be configured to substitute a stateroom number for a mobile telephone or home number when the communication device (100) is within communication proximity of the ship's network. This is but one example of filtering that can be accomplished with embodiments of the invention. It will be clear to those of ordinary skill in the art having the benefit of this disclosure that numerous other filtering steps can occur without departing from the spirit and scope of embodiments of the invention.

Where the communication device (100) includes a calendaring application 215 or other similar application for organizing locally stored event entries 216, the integrator 211 can be configured to integrate the private network event entries 217 of the private network scheduling information (110) into the calendaring application 215. As with the private network directory information (109), this integration can result in a seamless presentation of unified data. Locally stored event entries (216), such as Bob's birthday, can be presented with temporary private network events, such as a cabaret show on Tuesday evening.

Additional communication features can be provided as well. For instance, again using the cruise ship (105) as an illustrative example, when presenting entries in the address book application 212, those entries may be presented differently based upon where the cruise ship (105) is, as determined from the itinerary of the private network scheduling information (110). When the cruise ship (105) is at sea, the integrator 211 can be configured to substitute a stateroom number for a mobile telephone or home number. Conversely, when the cruise ship (105) is in port, as indicated by the itinerary, it may be preferable to use a land-based communication system. If a user desires to call a guest that is scheduled on a land paced tour, then the integrator can determine the were the guest is scheduled to be, in this case off the ship, and preferentially call the guests mobile number. Accordingly, the integrator 211 can be configured to present mobile telephone numbers in place of the stateroom numbers. Said differently, the contact information common to both the private network directory information (109) and the locally stored entries 213, that contact information can be presented in a manner that is dependent upon location information retrieved from the private network scheduling information (110).

In one embodiment, service provider access for the communication circuit 203 can even be directed. On a cruise ship (105), when communicating, it may be desirable to primarily access the ship's private network, which may be a WAN or WLAN. When the cruise ship (105) is in port, it may be preferable to use a wireless network. It may further be preferable to use a particular wireless network for preferred rates. The one or more processors 201 may direct the communication circuit 203 to do so by way of the retrieved information from the private network (101).

When the cruise ship (105) is at sea, as indicated by the itinerary, the one or more processors 201 may direct the communication circuit 203 to initially attempt to communicate with the ship's network as a priority using extensions or numbers associated with the network. Conversely, when the cruise ship (105) is in port, as indicated by the itinerary, the one or more processors 201 may direct the communication circuit to attempt to communicate with a PLMN as a first priority. The PLMN may be associated with a specific service provider. In short, the one or more processors 201 can be configured to cause the communication circuit 203 to change from a first communication network to a second communication network in response to scheduled location changes of the cruise ship (105) as set forth in the itinerary.

In one embodiment, the communication priority look-up can be accomplished by way of a soft SIM 220. A soft SIM 220, known in the art, can be used in accordance with embodiments of the present invention to change the network credentials, and preferred roaming directions based upon itinerary information selected from the private network scheduling information (110). Such as soft SIM 220 can be downloaded, for example, when the association module 209 registers the communication device (100) with the private network (101). Note also that various modules 208 may be included with the soft SIM 220. For example, the integrator 211 can be downloaded as a component of the soft SIM 220 for use in the communication device (100).

An alert module 218 can be included in the communication device (100). The alert module 218 can be configured to present an alarm on the user interface 204 of the communication device (100) that corresponds to activity information derived from the private network scheduling information (110). Continuing with the cruise ship example, the alert module 218 can be configured to present reminders to return to the cruise ship (105) at various ports of call.

A tagging module 219 can be included to allow users to tag private network events 217 from the private network scheduling information (110). For instance, a passenger on a cruise ship (105) may pass a theater offering a show that would be of interest to the passenger's family. The passenger may select a corresponding show time from the private network events 217 and tag it with the tagging module 219. Other members of the user's group, i.e., the user's family in this example, would then see that the event had been tagged when their private network information retriever 210 downloads updated private network scheduling information (110). In so doing, embodiments of the present invention permit assistance with scheduling and managing activities for guest and group participation.

In one embodiment, once the temporary membership with the private network (101) terminates, the integrator 211 can be configured to remove all information received from the private network (101) from either or both of the address book application 212 and the calendaring application 215. For example, when a person departs a convention center (104), the person may no longer need the list of company meetings that were scheduled during his stay. Accordingly, these private network events 217 may be removed from his calendaring application 215. Similarly, the person may no longer need the extension for room service in the convention center (104). Accordingly, this information can be removed from the address book application 212. In one embodiment, the user may be given an option to retain some or all of the information prior to removal by the integrator 211. For instance, the user may desire to keep the itinerary of some meetings to share with co-workers.

Figure 3:
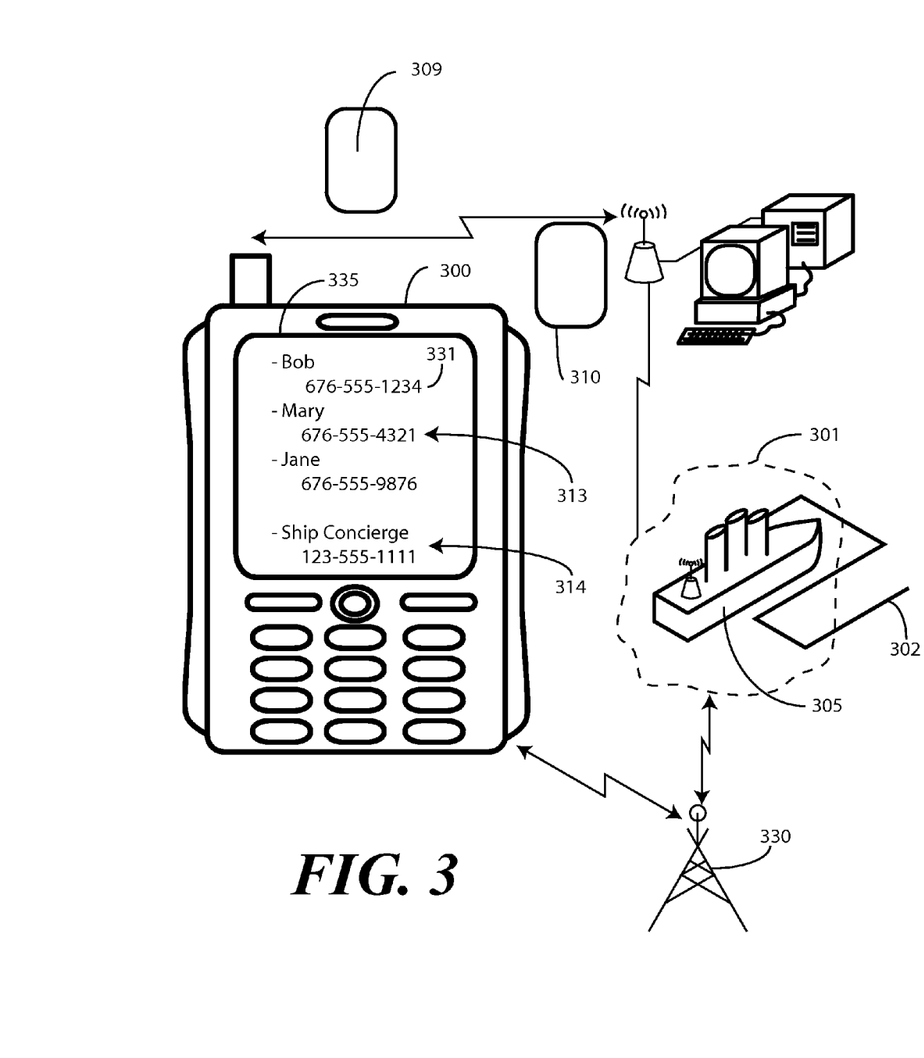
FIGS. 3 and 4 graphically illustrate temporary calling features of a communication device configured for use with an exemplary private network in accordance with embodiments of the invention.
Figure 4:
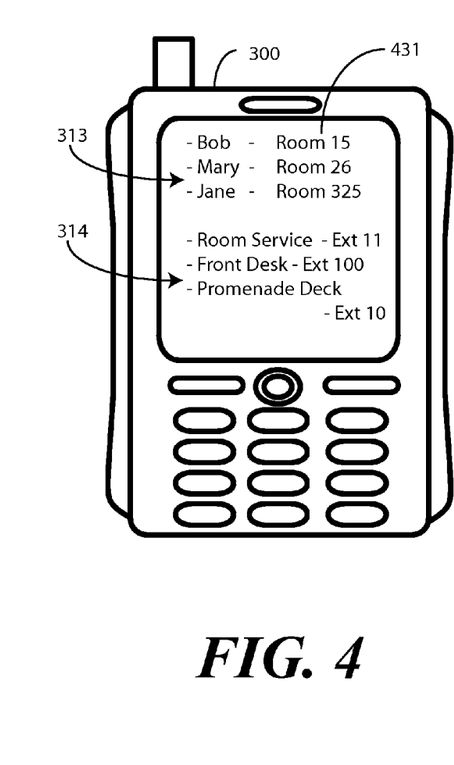

Turning now to FIGS. 3 and 4, illustrated therein is a communication device 300 configured in accordance with one embodiment of the invention that illustrates one exemplary application of directory information presentation. Beginning with FIG. 3, the communication device 300 is a temporary member device with a private network 301 associated with a cruise ship 305. Accordingly, a private network information retriever (210) of the communication device 300 has retrieved both private network directory information 309 and private network scheduling information 310 and has stored them in a memory (202). The private network directory information 309 has been integrated into an address book application (212), while the private network scheduling information 310 has been integrated into a calendaring application (215).

In FIG. 3, the cruise ship 305 is docked at a local port 302 of call. The user in this illustrative example has temporarily disembarked the cruise ship 305 for a day of sightseeing, and has activated the address book application (212). In accordance with one configuration of the integrator (211) of the communication device 300, both locally stored entries 313 and private network entries 314 are present on the display 335.

In this illustrative example, the cruise line has negotiated a preferred communication contract with a PLMN 330. As the private network scheduling information 310 indicates that the cruise ship 305 is at port 302, the one or more processors (201) of the communication device 300 direct the communication circuit (203) to attempt initial communication with any entry of the address book application (212) with the PLMN 330 in accordance with information found in the private network scheduling information 310. Further, as the PLMN 330 is being used for communication, both the locally stored entries 313 and private network entries 314 are shown on the display 335 with identifiers 313—in this case telephone numbers—that are to be used with the PLMN.

When the user selects one of the entries, the communication circuit (203) of the communication device 300 initiates communication through the PLMN 330. For example, if the user needs to contact the ship, the user will place a call through the PLMN 330 to the private network 301.

Turning to FIG. 4, in this figure, the cruise ship (305) is out to sea. Accordingly, the locally stored entries 313 and private network entries 314 are presented with identifiers 431 that have changed in accordance with the private network scheduling information 310. In this illustrative embodiment, the identifiers 431 correspond to the private network (301), and are shown as stateroom extensions and other PBX extensions associated with ship services. Thus, when a user wants to contact a person in the stateroom, the user makes the appropriate selection and the one or more processors (201) of the communication device 300 direct the communication circuit (203) to initially attempt communication with the private network (301) of the cruise ship (305).

Figure 5:
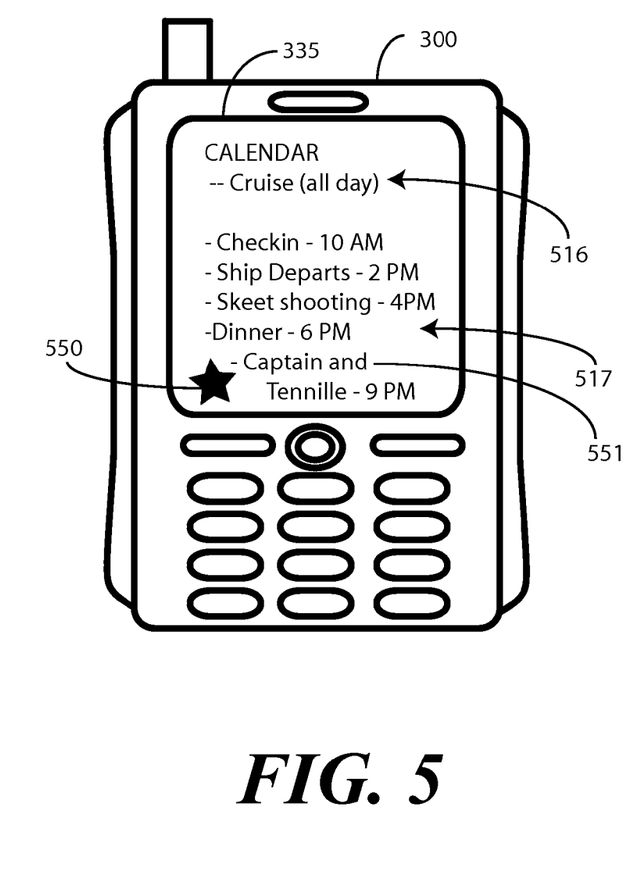
FIGS. 5 and 6 graphically illustrate temporary scheduling features of a communication device configured for use with an exemplary private network in accordance with embodiments of the invention.
Figure 6:
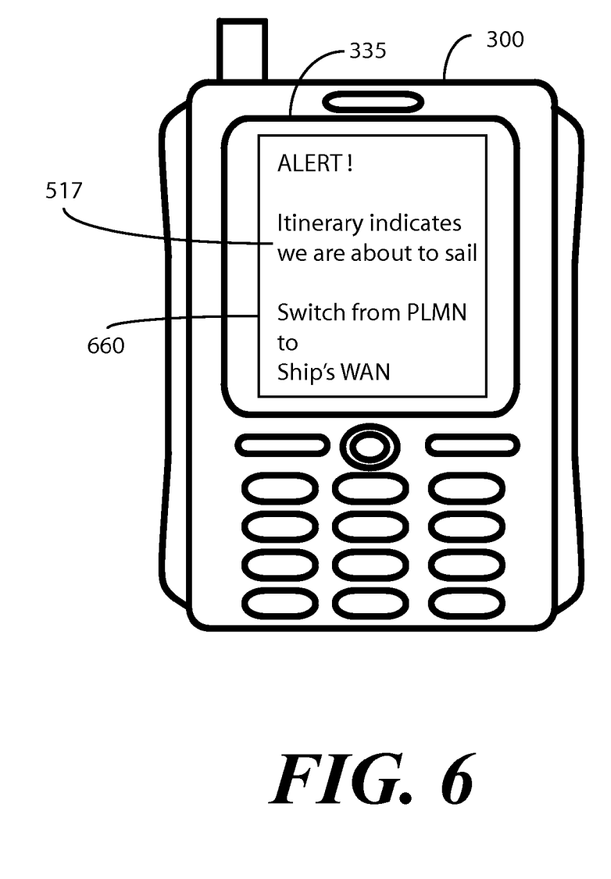

Turning now to FIGS. 5 and 6, illustrated therein is the communication device 300 of FIGS. 3 and 4 configured in accordance with one embodiment of the invention that illustrates one exemplary application of scheduling information presentation. As with FIGS. 3 and 4, the communication device 300 of FIGS. 5 and 6 is a temporary member device with a private network (301) associated with a cruise ship (305). Accordingly, a private network information retriever (210) of the communication device 300 has retrieved both private network directory information 309 and private network scheduling information 310 and has stored them in a memory (202). The private network directory information 309 has been integrated into an address book application (212), while the private network scheduling information 310 has been integrated into a calendaring application (215). While FIGS. 3 and 4 illustrated directory presentation, FIGS. 5 and 6 illustrate scheduling presentation.

In FIG. 5, an exemplary day's calendar is present on the display 335. The calendar includes both locally stored events 516, which have been input by the user, and private network events 517, which were retrieved from the private network scheduling information (310). Both types of events are seamlessly presented to the user with the calendaring application (215) of the communication device 300.

In one embodiment, the calendaring application (215) can identify the different types of events for the user. For example, in one embodiment, the locally stored events 516 can be presented in a first color, while the private network events 517 can be presented in a second color. In another embodiment, the locally stored events 516 can be presented in plain text, while the private network events 517 can be presented with a demarcation, such as a box, italics, or boldfaced type.

In the illustrative embodiment of FIG. 5, a tag 550 is shown with event 551. A user has made reservations to attend this event by attaching a tag to the event with the tagging module (219) of the communication device. Accordingly, the members of his group see this by viewing the tag 550 that was received with updated private network scheduling information (310).

Turning now to FIG. 6, an alert 660 is presented on the display 335 of the communication device 300. In this illustrative embodiment, the alert module (218) of the communication device has notified the user of a private network event 517 taken from an itinerary in the private network scheduling information 310. The alert 660 indicates that a transition is to take place between a first communication network and a second communication network in response to a scheduled location change of the cruise ship (305). In this example, the alert 660 indicates that the communication device 300 will be transitioning from a PLMN to the ship's private network (301). As noted above, this can be accomplished with a soft SIM (220) that changes the credentials of the communication device 300 in response to the private network scheduling information 310.

Figure 7:
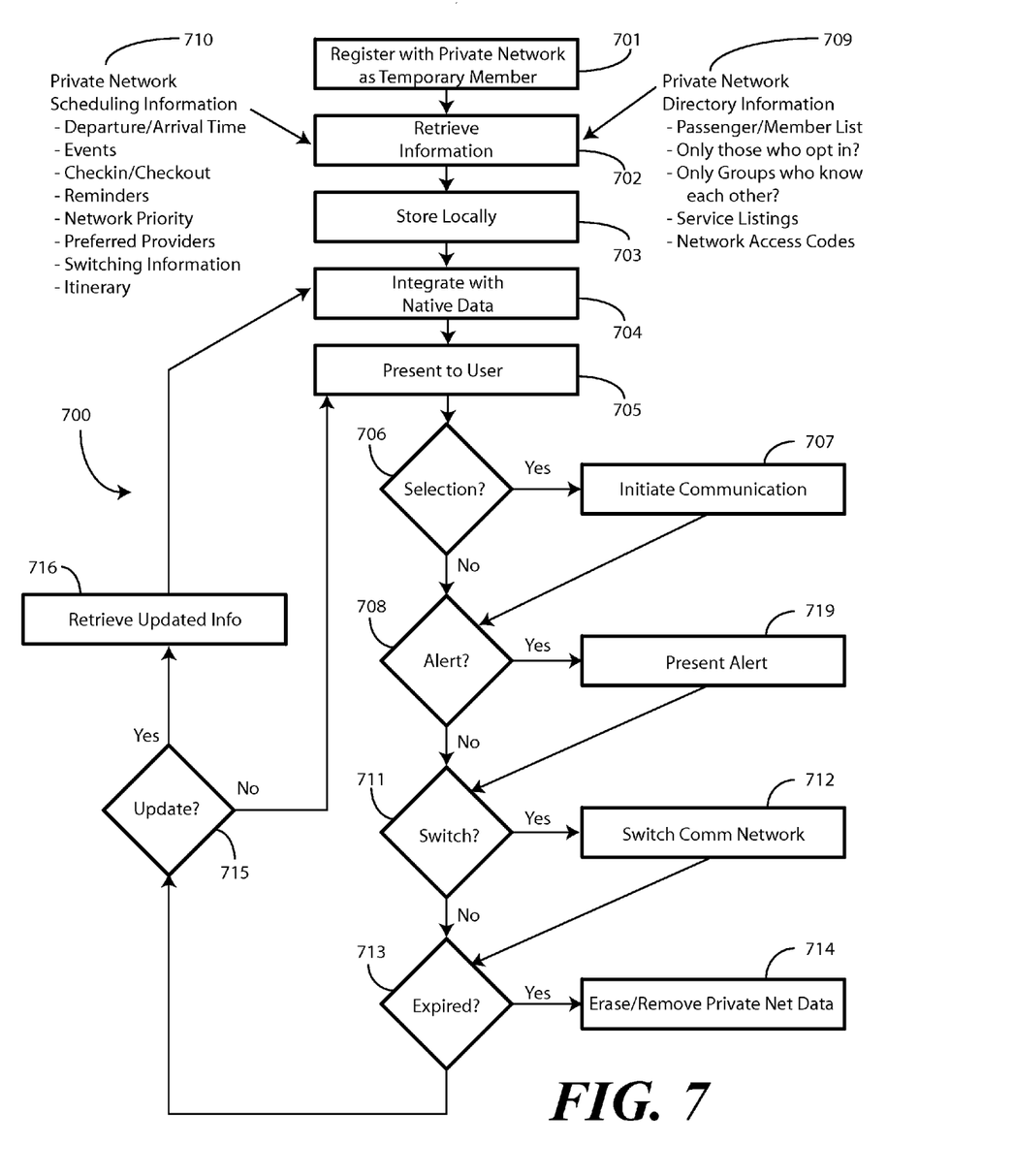
FIG. 7 illustrates a method for providing temporary communication features, temporary scheduling features, or combinations thereof, in accordance with embodiments of the invention.

Turning now to FIG. 7, illustrated therein is a method for providing either or both of temporary communication features and temporary scheduling features with a private network in an application or module of a wireless communication device in accordance with embodiments of the invention. The steps of FIG. 7 can be configured as executable instructions suitable for storage in a memory (202) or other computer readable medium for use by one or more processors (201) in a wireless communication device. Alternatively, the steps can be configured in hardware as programmable logic.

In the interest of brevity, the flow chart of FIG. 7 will be described in the alternative as options relate to communication features and scheduling features. It will be clear to those of ordinary skill in the art having the benefit of this disclosure that various combinations of these features can be implemented in a communication device as a particular application necessitates.

At step 701, a wireless communication device is registered as a temporary member device with a private network. As noted above, the private network can be associated with any number of entities, including cruise ships, airplanes, venues of public gathering such as concert halls, stadiums, civic centers, and arenas, convention centers, private businesses, hotels, resorts, and so forth. As noted above, in one embodiment, this can be accomplished by an association module (209) in the wireless communication device.

At step 702, private network information can be retrieved from the private network. In one embodiment, the private network information includes private network directory information 709, such as a directory to shipboard personal and services or a directory to other guests or members of the private network. As noted above, in one embodiment the private network directory information 709 will include only those members who grant permission or otherwise opt-in to having their information provided. As also noted above, the private network directory information 709 can include only a predetermined subset of the members of the private network, such as a family, a group of company members, or a group of traveling companions.

In another embodiment, the private network information includes private network scheduling information 710, such as departure or arrival times (where the private network is associated with a transport vessel or vehicle), listings of events, check-in or checkout times, reminders and so forth. In one embodiment, the private network scheduling information 710 includes directions for getting to events and places listed in the private network scheduling information 710, as well as access codes, special offers, and other instructions associated therewith. As noted above, the private network scheduling information 710 can also include information regarding prioritization of communication network selection, such as preferred providers and when particular networks should be selected.

In another embodiment, the private network information includes a combination of private network directory information 709 and private network scheduling information 710. A private network information retriever (210) within the wireless communication device can retrieve the private network directory information 709, the private network scheduling information 710, or combinations thereof.

At step 703, the private network information can be stored in a memory or other computer readable medium of the wireless communication device. This local storage offers an advantage over prior art systems in that the wireless communication device can use the information without the need of being in communication with the private network. For example, where the private network information is private network scheduling information 710, and the private network is a hotel, a user can be away from the hotel and still receive alerts. If the user is at dinner, and a show at the hotel is scheduled, the wireless communication device is capable of presenting an alert by detecting the show event from data stored in memory. This contrasts with prior art systems where alerts had to be sent via messaging or email, and which required that the wireless communication device be in continual communication with the private network.

At step 704, the private network information is integrated into applications of the wireless communication device. The integration step 704 and the storage step 703 can be combined into a single step. In one embodiment, private network directory information 709 can be integrated into an address book application (212) by an integrator (211) of the wireless communication device. In another embodiment, private network scheduling information 710 can be integrated into a calendaring application (215) of the wireless communication device. Of course, combinations of the two can also be implemented.

In one embodiment, the integration can be in accordance with user preferences. For example, where communication identifiers are different in different networks, the integration can include a substitution of the communication identifiers so as to present the appropriate identifier to a user when in communication proximity with a particular network. Using the cruise ship example from above, this can include substituting a number associated with an entry in an address book application (212) with a stateroom extension for the directory entry when the wireless communication device is within communication proximity of the private network. As noted above, communication proximity can be determined, in one embodiment, form the private network scheduling information 710.

At step 705, the private network information can be presented on a display (205) of the wireless communication device. In one embodiment, the private network information and locally stored information can be presented in a unified, seamless manner. In another embodiment, private network information can be identified as such and distinguished from locally stored information. In another embodiment, the user may be given a choice of whether to see the private network information, the locally stored information, or combinations thereof. In yet another embodiment, only those entries common to both the private network information and the locally stored information may be shown. (Note that while "locally stored information" is used to refer to user input information, both the private network information and the locally stored information are stored within the wireless communication device as a result of step 703.)

At decision 706, one or more processors (201) working in conjunction with a user interface (204) determine whether a user selection of presented data is made. For example, where a listing of directory entries is presented on a touch sensitive display, a user may desire to call one of the entries by touching that entry. When the one or more processors (201) receive the user selection, communication can be initiated at step 707. Where private network scheduling information 710 has been received, the selection of which communication network to use at step 707 can be at least partially determined by that information, as described above.

At decision 708, the one or more processors (201) may determine, with the assistance of an alert module (218), whether an alert should be presented to a user. Where this is the case, the alert may be presented on the user interface (204) at step 719. In one embodiment, the alert can correspond to an itinerary event from the private network scheduling information. Examples of such events include reminders and other notifications.

As noted above, embodiments of the invention can employ the private network scheduling information 710 to determine which networks and/or service providers to use for communication. Where multiple networks are available for communication, embodiments of the invention can prioritize the various networks based on the private network scheduling information 710. Where such selection and/or prioritization is used, the communication circuit (203) of the wireless communication device can select a communication network to use based upon, for example, a scheduled location of the of a cruise ship or airplane as set forth in a transport itinerary found in the private network scheduling information 710.

In such an embodiment, the method 700 may query whether a switch between networks is necessary at decision 711. For example, when a ship comes to port, the wireless communication device may switch from a proprietary WAN or WLAN to a PLMN based upon the travel itinerary. Such a switch is made at step 712. At this step, the communication circuit (203) of the wireless communication device may change from a first communication network to a second communication network in response to a scheduled location change of the ship, transport vessel, or vehicle.

In one embodiment, portions or all of either or both of the private network directory information 709 and private network scheduling information will no longer be needed once the temporary membership with the private network expires. Expiration of membership is accordingly determined at decision 713. A user may further be given a choice of whether to have this information removed, what portions to remove, and so forth at decision 713. Such data can be removed from the wireless communication device at step 714.

In one embodiment, updates of the private network information can be provided to the wireless communication device as they become available, as determined at decision 715. The purveyor of the private network can push such updates to the wireless communication device, or alternatively the user of the wireless communication device can request updates from time to time from the private network. In another embodiment, updates can be requested on a periodic basis, or in accordance with a schedule in the private network scheduling information 710. Updates are delivered at step 716.

Embodiments of the present invention can be deployed in the form of a software application operable on the wireless communication device. For instance, a person going to a company convention at a convention center (104) may download the "private network app" on a communication device. The application may include all of the modules shown in FIG. 2. Alternatively, only some of the modules may be included, with other modules being delivered as a soft SIM or with the private network information. In another embodiment, the application may be downloaded when the user arrives and registers with the private network.

Embodiments of the present invention can be configured to provide numerous features in a communication device. One embodiment allows users to call members of the private network by selecting those members from an address book application (212). Where the users are reachable through the private network, the communication device may initiate communication directly through a PBX or other switch of the private network without using external network resources. As described above, the directory presentation can be modified to show calling information associated with the private network, or to show which of a user's locally stored entries (213) are members of the private network. Calendaring features can include providing a user with reservation information in a calendaring application (215), providing visibility of tagged events and events scheduled by common members of a group, reminders, departure and arrival times, and other scheduling information.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in a wireless communication device of providing temporary communication features with a private network in an application of the wireless communication device, the method comprising:
   registering, with one or more processors and a communication circuit, the wireless communication device as a temporary member device with the private network;
   receiving private network directory information from the private network with the one or more processors and the communication circuit;
   storing, in a memory of the wireless communication device, the private network directory information by integrating the private network directory information with a locally stored address book directory of the wireless communication device;
   filtering the private network directory information by determining which entries of the private network directory information are common with entries of the locally stored address book; and
   presenting, on a user interface of the wireless communication device, only the entries common to both the private network directory information and the locally stored address book directory.

2. The method of claim 1, wherein the private network comprises a network associated with one of a cruise ship, an airplane, a resort property, a convention center, or a hotel.

3. The method of claim 2, wherein the private network comprises the cruise ship, wherein the private network directory information comprises at least a listing of passengers and corresponding stateroom extensions.

4. The method of claim 3, further comprising:
   receiving a user passenger selection of one or more of the passengers of the listing of passengers; and
   initiating communication with through the private network with a passenger communication device corresponding to the user passenger selection.

5. The method of claim 1, wherein the integrating comprises substituting a number associated with a directory entry, common to both the private network directory information and the locally stored address book directory, with a stateroom extension for the directory entry when the wireless communication device is within communication proximity of the private network.

6. The method of claim 1, wherein the private network directory information comprises only a predetermined subset of members of the private network.

7. A method, in a wireless communication device, of providing temporary scheduling features with a private network in an application of the wireless communication device, the method comprising:
   registering, with one or more processors and a communication circuit, the wireless communication device as a temporary member device with the private network;
   receiving private network scheduling information with the one or more processors and the communication circuit;
   storing, in a memory of the wireless communication device, the private network scheduling information; and
   integrating, within a calendaring application of the wireless communication device, the private network scheduling information.

8. The method of claim 7, further comprising receiving updated private network scheduling information, wherein the updated private network scheduling information includes a tagged event.

9. The method of claim 7, wherein the private network corresponds to a network on a transport vessel or vehicle, wherein the private network scheduling information comprises a transport itinerary, further comprising presenting a message alert corresponding to an itinerary event on a user interface of the wireless communication device.

10. The method of claim 7, wherein the private network scheduling information comprises a transport itinerary of a transport vessel or vehicle, further comprising selecting, with the one or more processors, a communication network for the wireless communication device based upon a scheduled location of the transport vessel or vehicle as set forth in the transport itinerary.

11. The method of claim 7, wherein the private network scheduling information comprises a transport itinerary of a transport vessel or vehicle, further comprising selecting, with the one or more processors, further comprising changing, with the communication circuit, from a first communication network for the wireless communication device to a second communication network for the wireless communication device in response to a scheduled location change of the transport vessel or vehicle as set forth in the transport itinerary.

12. The method of claim 11, wherein:
   the transport vessel or vehicle comprises a cruise ship;
   the first communication network comprises a public land mobile network;
   the second communication network comprises a wide area network of the cruise ship; and the scheduled location change comprises a departure from a port.

13. A communication device configured for at least temporary communication with a private network, comprising:
one or more processors;
a communication circuit being operated with the one or more processors;
an association module, being operated with the one or more processors, and configured to establish a temporary membership with the private network;
a private network information retriever, being operated with the one or more processors, and configured to retrieve private network scheduling information from the private network; and
an integrator, being operated with the one or more processors, configured to integrate the private network scheduling information into a calendar application of the communication device.

14. The communication device of claim 13, further comprising a soft subscriber identification module configured to change network credentials of the communication device based upon the private network scheduling information.

15. The communication device of claim 13, further comprising an alerting module configured to present an alarm on a user interface of the communication device corresponding to one or more activity events of the private network scheduling information.

16. The communication device of claim 15, wherein the private network comprises a communication network on a ship, wherein the private network scheduling information comprises at least port departure times.

17. The communication device of claim 13, wherein the integrator is configured to both integrate private network directory information into an address book application and integrate the private network scheduling information into the calendaring application, and, where one or more entries are common to both the private network directory information and address information of the address book application, to present contact information for the one or more entries, wherein the contact information is dependent upon location information from the private network scheduling information.

18. The communication device of claim 17, wherein each of the private network directory information and the private network calendaring information corresponds to a predetermined group having the temporary membership in the private network.

* * * * *